United States Patent [19]

Wesley

[11] Patent Number: 4,626,314

[45] Date of Patent: Dec. 2, 1986

[54] LABELING MACHINE ATTACHMENT FOR STACK EXITING OF ROUND LABELED OBJECTS

[75] Inventor: James G. Wesley, Cicero, Ill.

[73] Assignee: Labelette Company, Forest Park, Ill.

[21] Appl. No.: 657,980

[22] Filed: Oct. 5, 1984

[51] Int. Cl.[4] .......................... B65C 9/04; B32B 31/00

[52] U.S. Cl. .................................... 156/449; 156/488; 156/539; 156/DIG. 26; 156/DIG. 40

[58] Field of Search ............... 156/446, 487, 448, 449, 156/450, 455, 453, 351, 361, DIG. 33, 540, 539, 541, 488, DIG. 13, DIG. 26, DIG. 40, DIG. 41, DIG. 42, 215

[56] References Cited

U.S. PATENT DOCUMENTS

| | | | |
|---|---|---|---|
| 3,278,359 | 10/1966 | Wesley | 156/351 |
| 3,553,049 | 1/1971 | Wolff | 156/450 |
| 3,834,963 | 9/1974 | Hoffman | 156/450 |
| 4,108,210 | 8/1978 | Hoffman | 156/450 |
| 4,124,429 | 11/1978 | Crankshaw | 156/449 |
| 4,162,182 | 7/1979 | Wesley | 156/487 |
| 4,272,311 | 6/1981 | D'Angelo et al. | 156/449 |

*Primary Examiner*—Edward Kimlin
*Assistant Examiner*—Louis Falasco
*Attorney, Agent, or Firm*—Mann, McWilliams, Zummer & Sweeney

[57] ABSTRACT

A labeling device in the nature of an attachment for application to a labeling machine of the type disclosed in Wesley U.S. Pat. No. 3,278,359 for adapting the machine of that patent to mechanically exit from the labeling station, in a stack-like manner, round objects of small to medium diameter sizes to be labeled by the machine, such as paper tubes or bottle type containers, in which the device comprises a conveyor frame and an associated panel structure that are mounted on the machine in overlying relation to the hopper floor plate and that are adjustably secured together to define a roller way that has its entrance disposed adjacent the machine labeling station to consecutively receive the individual objects after they have been labeled as they are displaced from the labeling station or replaced by another object of the labeling run involved that is to be similarly labeled, after which on the roller way the freshly labeled rounded objects are consecutively rolled up the roller way for exit therefrom at the roller way discharge end for gravity discharge from the labeling machine over the upper end of the machine hopper floor plate, as the labeling of the run of objects involved proceeds.

6 Claims, 5 Drawing Figures

LABELING MACHINE ATTACHMENT FOR STACK EXITING OF ROUND LABELED OBJECTS

This invention relates to semi-automatic labeling machines, and more particularly, to a labeling device or mechanism arranged for application as an attachment to the basic semi-automatic glue labeling machine of Wesley Pat. No. 3,278,359, granted Oct. 11, 1966, to adapt labeling machines of that type to stack exit from the labeling station for gravity discharge from the machine, small round objects that are cylindrical in nature, such as paperboard tubes or bottles, that are being labeled as a run of such items being labeled as a result of a specific setting up of the basic machine involved for that purpose.

The labeling machine of the above identified patent provides an arrangement for conveniently applying discrete labels to round containers employing glue labeling procedures in which the containers are one by one manually laid sidewise on a pair of rotating support rollers forming the support cradle or crib for the container being labeled, and the label for the container that is being processed is mechanically separated from a supply of such labels in the machine label hopper, brought past a glue station where glue is applied thereto, and guided into cooperation with the container in timed sequence to the rotation of the container, so that the label becomes affixed to the round side wall of the container in the manner disclosed in accordance with the invention of said patent. As disclosed in said patent, the glue labeling procedures and apparatus there contemplate that the labels to be processed are placed, adhesive-free, in a stack in the label supply hopper that includes a downwardly sloping floor plate. The labels are fed one at a time from the hopper to a register station, and when the container to be labeled is applied to the labeling machine support rollers, the label for the container is passed through the glue station and is guided into cooperation with the container, in the manner already indicated.

Among the numerous advantages of the machine of said patent is that the machine can be set up or adjusted for labeling round containers of varying sizes, and also can handle labels for application to such containers that are of different lengths and widths. Once the machine in question has been so set to label a particular sized container with a particular shaped label, any desired number of such containers may be effectively and efficiently labeled semi-automatically with the particular shaped label involved, with the worker manually and by hand applying the container to be labeled to the machine constantly rotating support rollers, and removing the labeled container therefrom by hand to manually replace same with the next container, of the labeling run involved, to be labeled.

One way the labeling machine of said patent is frequently employed is for labeling small round objects of cylindric configuration, such as paperboard tubes, or small glass or plastic bottles. For these purposes, it is presumed that quite a number of a particular run of the same size of such an object is to be labeled, as, for instance, 10,000 paperboard tubes of the same diameter and length, that may be of, for instance, one inch nominal dimension in outside diameter, or 10,000 glass or plastic bottles of the same exemplary O.D. (and having the same length). By appropriately setting the movable support roller of the machine labeling station relative to the labeling station fixed axis support roller, the cylindric objects involved may be rotatably supported on the labeling station rollers with the desired operating relation to the machinery controls, which may also be set or adjusted to achieve this end, as needed. Similarly, the label hopper and label feed controls are adjusted or set to accommodate the specific size, thickness and stiffness of the labels to be employed for the particular labeling run involved. With the labeling machine in question set to label cylindric objects of the same size, shape and length, with identical labels, any number of such cylindric objects may be semi-automatically labeled, and for reasons of economy of operation the larger the number of such objects to be labeled in a particular labeling run, the more efficient the labeling operation becomes as the machine does not have to be shut down and re-set to handle different size or shaped objects and/or labels of different size, shape, etc.

However, the relative small size of many of the cylindric objects that can be labeled employing the machine of said patent can result that the actual labeling time per unit being relatively small relative to the time per unit required to manually pick it up, put it into the machine, before labeling, and manually remove it from the machine after labeling for replacement by the next unit to the labeled. Further, the repetitious handling of such objects that is required by the machine operator is tiring, with the result that the labeling procedure may take a good deal more time and may be a good deal more fatiguing than good business practice would expect.

A principal object of the present invention is to provide an attachment for the machine of said patent which adapts said machine so that the operator does not have to contend with manual handling of the objects after they have been labeled, with such objects being exited from the labeling station by the manual application thereto of a replacement object to be similarly labeled, and the labeled objects being rolled away from the machine labeling station and gravity discharged from the machine for subsequent handling as needed.

Another principal object of the invention is to provide an attachment for the labeling machine of said patent which adapts said machine so that the operator in placing an unlabeled round object of the labeling run in question in labeling position at the labeling station displaces the previously labeled object therefrom and into a conveying arrangement that mechanically rolls the freshly labeled object away from the labeling station to a point of gravity discharge from the machine, as into a collection bin, or onto a collection conveyor, or the like, for further handling purposes.

Another principal object of the invention is to provide an attachment for the labeling machine of said patent that, while being compatible with the arrangement and operation of said machine, adapts said machine to handle labels of miscellaneous objects of cylindric configuration with increased speed, efficiency, and general facility.

Yet another principal object of the invention is to provide an attachment for said machine of said patent and adapts it to handling of small cylindric objects with increased facility and less manual handling, that is economical of manufacture, that is convenient to install and use, and that is long lived in operation.

In accordance with the invention, the attachment comprises a conveyor frame having intake and discharge ends, with the frame intake end being articulated to the basic labeling machine in question in alignment with the axis of the labeling station stationary axis support roller, with the conveyor frame discharge end being propped against the upper end of the labeling machine floor plate to dispose the conveyor frame in overlying relation to the labeling machine floor plate. The conveyor frame includes an endless conveyor arrangement in the form of spaced apart ribbons or bands that extend between and define in the operation thereof the conveyor frame intake and discharge ends, with the endless bands or ribbons each including an upper conveying run and a lower return run.

The attachment further comprises a panel structure mounted on said conveyor frame in overlying relation to the conveyor runs, which panel structure includes a planar frictional rolling surface defined by a suitable foam or the like that opposes and is spaced from the conveying band upper conveying runs. The panel structure is mounted on the conveyor frame to set the panel structure with respect to the conveyor frame to space the panel structure roller surface from the conveyor upper runs, along the length of the latter, for defining a roller way for the objects that have been freshly labeled, for rolling friction engagement relation thereof with both the conveyor upper conveying runs and the panel structure rolling surface. The panel structure may be adjusted both toward and away from the conveyor frame and longitudinally thereof to properly set same relative to the conveyor station in light of the specific cylindric objects to be labeled as part of a labeling run, and the panel structure is equipped with adjustable side guides extending longitudinally thereof that are set to the length of the object being labeled, so as to define the sides of the roller way that is to be formed by the practice of the invention. The attachment conveyors are adapted to be driven by the roller shaft of the machine fixed axis roller, and thus the attachment conveyor frame conveyor ribbons are continuously operating, when the device has been applied to the machine in question. The components involved are proportioned such that as the individual objects are applied to the machine labeling station to be labeled, they displace the previously labeled object which passes into the attachment roller way for rolling up the roller way for gravity discharge from the upper end of the conveyor frame over the upper end of the machine labels supply hopper floor plate. Thus, manual handling of the objects to be labeled is confined to applying them to the machine to be labeled, which action brings into play mechanical exiting of the freshly labeled objects, in a sequential, stack-like manner, away from the labeling station and into gravity discharge from the machine, free of manual action by the machine operator as to removal of the labeled objects from the machine is concerned.

Other objects, uses and advantages will become obvious or be apparent from a consideration of the following detailed description and the application drawings in which like reference numerals indicate like parts throughout the several views.

However, it is to be distinctly understood that the specific drawing illustrations provided are supplied primarily to comply with the requirements of the Patent Laws, and that the invention is susceptible of variations and modifications that will be obvious to those skilled in the art, and are intended to be covered by the appended claims.

GENERAL DESCRIPTION

Figure 1:
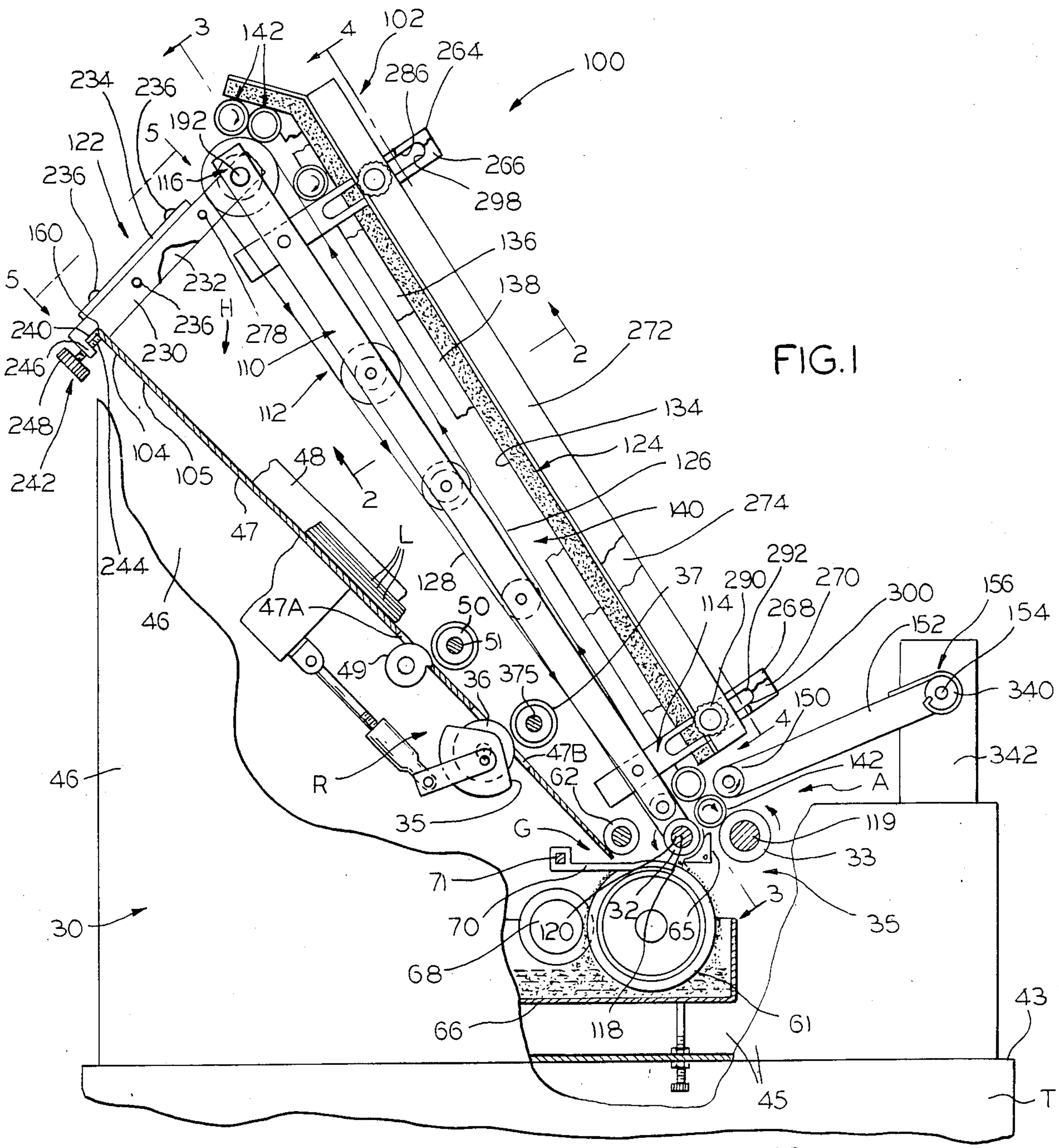
FIG. 1 is a side elevational view illustrating the machine of said patent as equipped with the attachment of the present invention, showing the basic component parts of the machine hopper floor plate, the label feed rollers, the glue station, and the labeling station, in vertical section, with the basic labeling machine itself being essentially block diagram illustrated.

Referring first to FIG. 1, which illustrates diagrammatically a number of the basic components of the basic glue labeling machine of said Wesley patent (the disclosure of which is hereby incorporated herein by this reference), it will be seen that the labeling machine 30 generally comprises an inclined adjustable hopper H in which a supply of adhesive free labels L are supported for separating and feeding one by one past a glue station G, at which glue is applied to the individual label L being processed, with the label L then being guided into cooperation with a container (not shown in FIG. 1 but shown at C in said patent), that is to be disposed at the labeling station A and rotated for application thereto of the freshly adhesive coated label L. In accordance with the disclosure of said patent, round containers or cans are applied to a pair of constantly driven support rollers 32 and 33 which form a support cradle or crib 35 for the container being labeled, with the roller 32 being located on a fixed or stationary axis adjacent to and above the output side of glue station G, while the other support roller 33 is mounted for adjustment toward and away from the roller 32 so that containers of different diameters may be supported in the desired support relation by the two rollers 32 and 33.

As described in said patent, the labels L are fed one at a time from hopper H to a register station R that is defined in part by a retractable register stop 35; when the leading edge of the label L is engaged by the stop 35, such leading edge is located between a pair of constantly driven, normally separated, feed rollers 36 and 37 so that upon withdrawal of the stop 35 and on engagement therewith of the two feed rollers 36 and 37, the label L that has been advanced to the register station R is withdrawn from the hopper H and advanced to and through the glue applying station G for application to the container.

The hopper H is provided with a sloping bottom or floor plate 47 and has a pair of adjustable side guides 48 that together with the floor bottom plate 47 define the hopper H in which a stack of labels L to be processed in the labeling run is positioned. Feed roller 36 and register stop 35 project through an opening 47B in the floor plate 47, and the plate 47 extends beyond or to the right of the opposed feed rollers 36 and 37 (as viewed in FIG. 1) to a point just above the left hand side of the relatively large glue coating roller 60 that forms a part of glue coater 61 that is located just beneath and somewhat to the left of the support roller 32 ( as shown in FIG. 1).

As a label L is advanced by the feed rollers 36 and 37 from the register position, such label L moves along the plate 47 and beneath the guiding and feeding roller 62 and thence into engagement with the coating roller 60 (see FIG. 7 of said Patent) that is constantly rotating, from which it moves into label applying position from beneath the support roller 32, where the leading edge of the label strikes a series of spaced guide plates 65 that direct the leading edge of the label outwardly from between the guide plates 65 of the support roller 32 into a label outfeed position where the label is intended to engage the external wall surfacing of the container that is supported by the support rollers 32 and 33, which are constantly rotating while containers of like size are being processed semi-automatically in a particular labeling run of such containers, in accordance with said patent.

Other related parts of the machine of said Wesley patent are shown in FIG. 1, with identical reference numerals being applied thereto, it being understood that reference may be had to said Wesley patent for a complete description of the component parts involved and their operation.

As has already been indicated, said machine of said Wesley patent can be set to glue label round containers of various sizes, and further the machine can be set to label round objects in general that are of a cylindric configuration, such as paperboard tubes and the like, and small bottles formed of glass or plastic and the like. Cylindric objects of this type may have external diameters of as little as one inch and may have a relatively short length that may be in the range of from about several inches to a foot or more in dimension, depending on the product involved.

The basic machine of said patent has its support rollers 32 and 33 arranged for adjustment to accommodate such relatively small sizes, which may include using relatively small hubs that serve as the object supporting rollers 32 and 33. Similarly, the label handling and glue application components of the machine can be adjusted and set to handle relatively small labels of different sizes and shapes, as may be needed for a particular label run. Of course, for any particular label run, economy of operation calls for the machine to be set up to handle quite a number of cylindric objects of the same size and shape for being labeled with identical labels, so that the machine can be automatically operated in accordance with said patent to label, for instance, several thousand or more identical rounded objects to be labeled. The procedure and method of operation involved calls for the machine operator to stand in front of the labeling station A (to the right of FIG. 1), and one at a time pick up one of the objects to be labeled and place it in the labeling station A, after which the machine functions automatically to label such object as it rotates on the support rollers 32 and 33, after which the operator is to manually remove the freshly labeled object from the support rollers 32 and 33 and manually replace it with the next identical object to be so labeled.

In accordance with the present invention, the labeling machine attachment 100 is provided to equip the machine 30 so that the operator in applying an object to be labeled to the support rollers 32 and 33 displaces from such support rollers 32 and 33 the object previously labeled, which is then mechanically removed from the labeling station A, and moved to a point of convenient gravity discharge from the machine 30, free of further manual activity by the machine operator in this regard.

The attachment 100 comprises rounded labeled object processing or mechanism 102 that is applied between the machine labeling station A and the upper end 104 of the machine hopper floor plate 47, in overlying relation to the hopper H, the register station R, and the glue applying station G, the component parts of which are to operate in conjunction with the component parts of the labeling station A in accordance with the objectives of the invention.

The device or mechanism 102 comprises a conveyor frame 110 (see FIGS. 1 and 3) that is equipped with one or more endless conveyor member ribbons or bands 112 (two in the illustrated embodiment) that are trained lengthwise of the conveyor frame 110, and are driven so that their bands 112 move in the direction indicated by the arrows of FIG. 1, whereby the conveyor frame 110 has a labeled object intake or receiving end 114, and a labeled object discharge end 116. The conveyor frame 110 at its end 114 is articulated to the machine 30 at the rotating axis 118 of its roller 32, and specifically to the shaft 120 that comprises the roller 32, while the discharge end 116 of the conveyor frame 110 is articulated to a prop frame 122 which may be anchored to the upper end 104 of the machine floor plate 47 to operatively mount the conveyor frame 110 in the position shown in FIG. 1, wherein it is disposed in overlying relation to the hopper H, the register station R, and the labeling station G, and projects from the roller 32 to a point above the elevation of the upper end 104 of the machine hopper floor plate 47.

Figure 2:
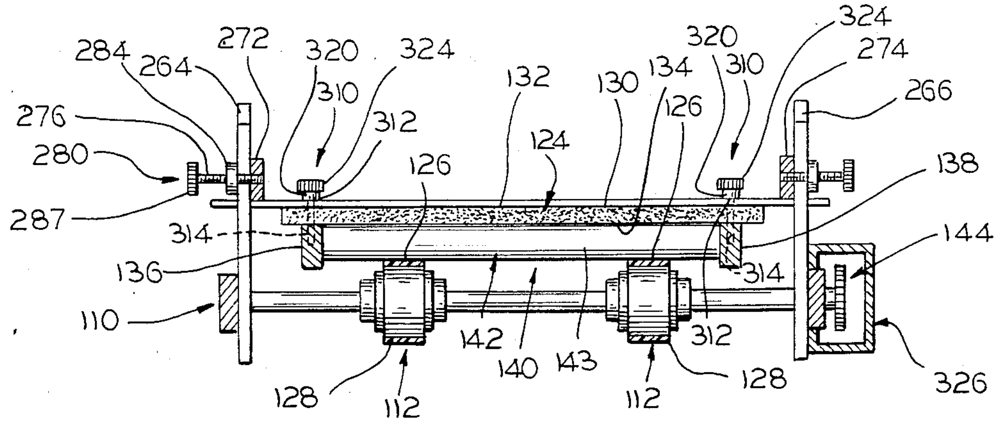
FIG. 2 is a diagrammatic fragmental sectional view taken substantially along line 2—2 of FIG. 1.

The mechanism or device 102 further comprises panel structure 124 that is mounted on the conveyor frame 110 in overlying relation thereto and is disposed in coextensive relation to the conveyor bands or ribbons 112, as indicated in FIGS. 1 and 2, and is on the upper run 126 side of the respective bands 112 of the conveyor frame 110, as distinguished from their lower runs 128. Panel structure 124 is mounted for adjustment toward and away from the conveyor frame 110, and comprises relatively stiff backing plate 130 (formed from steel or the like) to which is suitably affixed panel 132 that is formed of a suitable foam material, such as polystyrene, which defines planar or flat rolling surface 134 that opposes the respective conveyor member runs 126. Panel structure 124 along either side of same is equipped with side guide members 136 and 138 (see FIG. 2) that are adjustable toward and away from each other in sliding relation to the foam member 132.

As indicated in FIGS. 1 and 2, the foam member rolling surface 134, the conveyor upper runs 126, and the side guide members 136 and 138 define roller way 140 that receives the cylindric objects 142 being labeled, such as the paperboard tubes 143, at the intake end 114 of the conveyor frame 110 and discharges them from the discharge end 116 thereof for gravity discharge from the machine 30 across the prop member 122 and the upper edge 104 of the hopper floor 47 where the labeled tubes 143 may be suitably collected for further handling.

As indicated, the panel structure 124 is mounted on conveyor frame 110 for adjustment movement toward and away therefrom, ahd specifically for adjusting the spacing between the roller surface 134 thereof and the upper runs 126 of the conveyor members 112, the latter forming in association with the conveyor frame 110 a pair of endless conveyors 113 that are driven by drive transmission mechanism 144 (see FIGS. 2 and 3) from shaft 120 of support roller 32 to move in the directions indicated by the arrows of FIG. 1. The roller surfacing 134 of panel structure 124 is disposed in substantial parallel relation to the endless conveyor runs 126 and these components are spaced apart to frictionally receive the individual objects 142 therebetween at the discharge end 114 of conveyor frame 110, and move them upwardly of roller way 140, by way of the frictional engagement of the endless conveyor upper runs 126 and the roller surface 134 thereagainst, to the elevated position shown in FIG. 1, whereupon the objects 142 that have been labeled by the machine 30 gravity discharge across the prop member 122 and beyond the upper end of the hopper floor plate 47 for collection and further handling. The sides of the roller way 140 are set by the adjustable side guides 136 and 138, which are positioned apart a dimension approximating, while somewhat exceeding, the lengths of the objects to be labeled, which in the specific form illustrated are elongate paperboard tubes 143.

Further in accordance with the invention, the machine 30 is equipped with hold down roller 150 that is journalled on the end of swing arm 152 that is mounted for swinging movement about horizontal axis 154 (in front of labeling station A) that parallels the axes of rollers 32 and 33, with the swing arm 152 being proportioned lengthwise of same, and the axis 154 being disposed relative to the axes of the rollers 32 and 33, such that the roller 150 engages the upper side surfacing of an object 142 placed on the rollers 32 and 33 for labeling purposes, and specifically the part of the side surfacing of same that is at the worker's station or right hand side of FIG. 1. Swing arm 152 is preferably biased downwardly in the direction of the roller 33, in any suitable manner, as by employing suitable torsion spring 156.

In use, the attachment 100 is applied to the machine 30 when it is desired to label one or more runs of small cylindric objects of the type indicated, such as the tube 143. The machine 30, and specifically its components associated with the hopper H, the register station, the glue applying station G, and the labeling station A, are adjusted and set to mount individual tubes 143 for labeling purposes, and handle and process from hopper H labels of the size appropriate for application to the individual tubes 143. The panel structure 124 is adjusted relative to the conveyor frame 110 to define the breadth of the roller way 140 for mechanically receiving and rolling the tubes 143 longitudinally thereof, while the side guide members 136 and 138 are adjusted to serve as the side guides of the roller way 140 in the manner indicated in FIG. 2.

The machine operator, after the machine 30 is activated in the manner described in said patent, takes the first tube 143 and applies it between the biasing roller 150 and support roller 33 to operably mount the tube 143 in question for labeling purposes, which activates the machine 30 in the manner indicated in said patent to apply to same its label. The operator then applies the next tube 143 to be labeled between the biasing or pressure roller 150 and the support roller 132 to snap the freshly labeled tube 143 back out of the way and ihto the roller way 140, the displaced tube 143 now having been replaced by the fresh tube 143 to be labeled. The displaced tube 143 is frictionally engaged by the conveyor upper runs 128 and the roller surface 134 to be rolled upwardly of the roller way while the second tube 143 is being labeled, which is then replaced in the same manner for exiting from the labeling station of the roller way 140. As indicated, the labelled tubes 143 exit from the discharge end 116 of conveyor frame for gravity discharge from the device 102 across the prop member 122 that overlies the upper end 104 of the hopper floor plate 47, into a suitable collection bin or conveyor for further handling.

This processing of the tubes 143 proceeds until all of the tubes of the run involved have been labeled. As indicated, the labeled tubes 143 are mechanically exited from the labeling station and discharged from the machine 30, this requiring no operator manual operations in connection with the removal of the tubes 143 from the machine, other than the application thereto of fresh tubes to be labeled, in the consecutive order that has been indicated.

SPECIFIC DESCRIPTION

While reference may be had to said Wesley U.S. Pat. No. 3,278,359 for the specifics of the basic machine 30, some component parts there illustrated referred to herein to insure the needed understanding of the patented invention and the technical background in which it operates.

The basic labeling machine 30 has a relatively rigid support base or table T that suitably mounts the drive motor and speed reducer of the basic machine, as suggested in said patent, and the table T has a top 43 upon which the main portions of the basic machine 30 are mounted, including the spaced side frame members 45 and their upstanding support plates 46 that serve as a mounting means for the hopper H and for other elements of the machine, as disclosed in said patent. The hopper H, of course, includes the sloping bottom or floor plate 47 that has already been referred to, and which terminates in a top edging 160 at the upper edge portion 104 of the sheet 47. The means for separating the labels L that are applied to the hopper H for individual application to the objects 142 is of the top feed type, with the label separating means having adjustable but normally stationary rubber retard roller 49 mounted on an adjustable axis at the opening 47A of plate 47. Above the retard roller 49 and on an axis parallel thereto are one or more separating rollers 50 that are fixed on a freely adjustable support shaft 51 (which is supported and driven in the manner shown and described in said patent), which includes suitable gearing actuated by a swing arm that is not shown in FIG. 1 but is shown at 54 in said patent, being movable to shift a rubber roll (not shown) into engagement with a constantly driven knurlled roll fixed to the shaft 37S (which has feed rolls 37 fixed thereto for rotation thereby), this being done by the operation of the solenoid SOL-1 ( not shown) provided for this purposes, as disclosed in said patent.

The rollers 32 and 33 continuously rotate when the main control switch of the machine 30 is closed. As indicated, the roller 32 operates on a fixed horizontal axis 118 that parallels axis 119 of the adjustable roller 32, with the rollers 32 and 33 defining cradle or crib 35 for the object to be labeled that is disposed crosswise of the direction of feed or application of the labels to the individual objects to be labeled.

The roller 32 comprises suitable shaft 120 suitably journaled on the machine 30 and driven in the manner described in said patent, which involves a gear (not shown) fixed to the glue roller shaft meshed with pinion 170 (see FIG. 3) that is suitably keyed to the shaft 120. The roller 32 in practice is defined by suitable spaced collars or hubs 172 that may be formed from brass or cadminum plated steel, or from a suitable rubber of equivalent plastic material and fixed to the shaft 120 as by employing suitable set screws 174. Hubs 172 are all of the same external diameter that is suitable for a range of labeling runs to be effected by machine 30, and other labeling runs ( in terms of the external diameter size) may be accommodated by machine 30 by replacing the hubs 172 with similar hubs of greater or less diameter, depending on the nature of the cylindric objects to be labeled. Roller 33 is similarly constructed and is mounted and arranged in accordance with said patent. Of course, the rollers 32 and 33 could be continuous rollers having the diameter represented by the collars or hubs 172, but the separate hub arrangement employed is desired because of the adjustability involved for accommodating objects to be labeled of different sizes.

As disclosed in said patent, the adjustment of the roller 33 relative to the roller 32 is provided for by mounting same on bearings at its opposite ends (not shown but see FIGS. 4 and 6 of said patent) each of which is equipped with a nut applied to the threaded shaft. When adjustment of the roller 33 is desired, the aforesaid nuts are rotated in unison to move the opposite ends of the roller 33 toward and away from the roller 32; the disclosure of said patent may be referred to for an elucidation of this feature of the machine 30.

Figure 3:
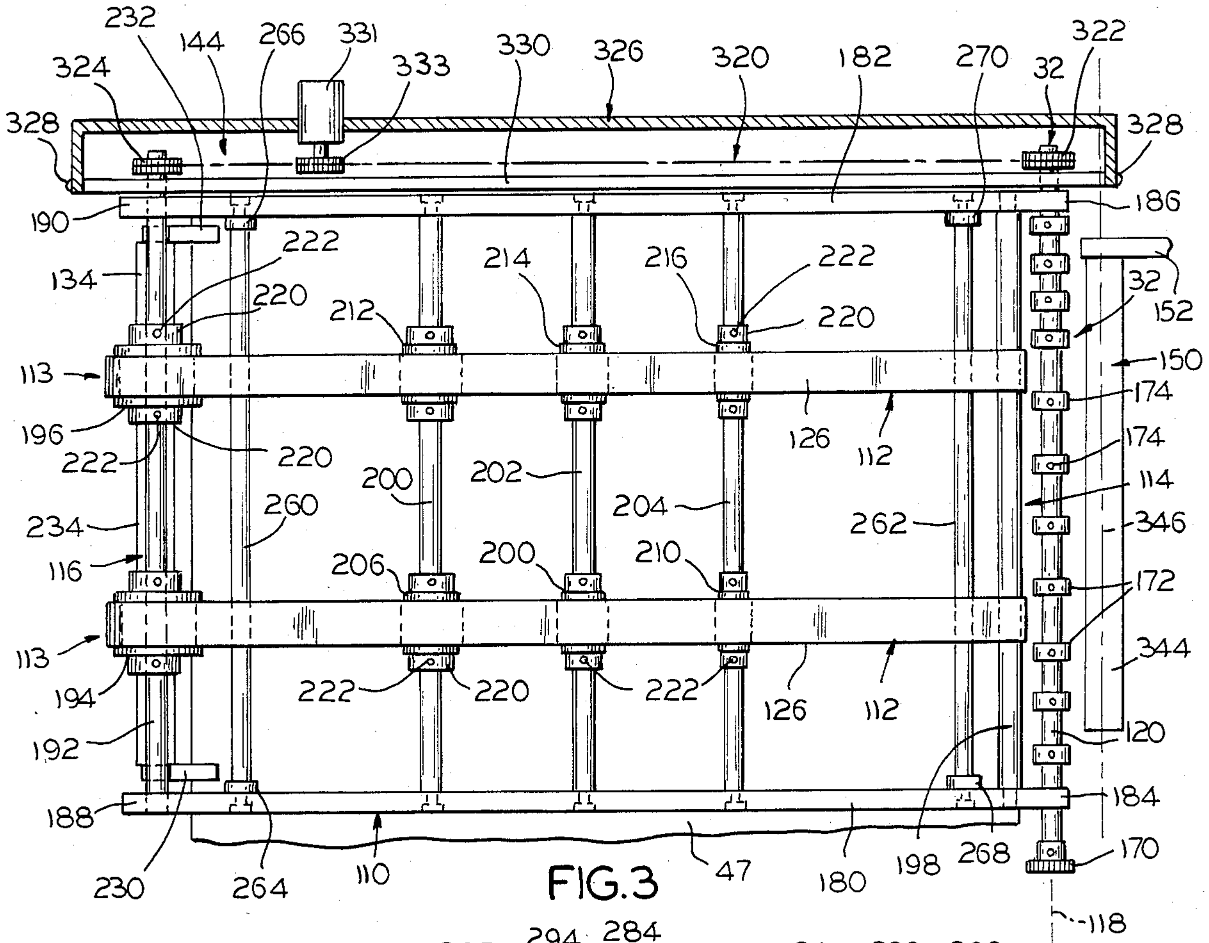
FIG. 3 is a sectional view taken substantially along line 3—3 of FIG. 1, showing in plan the conveyor frame of the attachment and associated parts.

The conveyor frame 110 generally comprises a pair of side frame members 180 and 182 (see FIG. 3), which at their ends 184 and 186, respectively, are swivelably mounted on shaft 120 of roller 32 in the mounted relation of attachment 100. Frame members 180 and 182 at their respective other ends 188 and 190 journal head end pulley shaft 192, which in the form shown has suitably keyed thereto a pair of head pulleys 194 and 196 in spaced apart relation over which the head ends of the respective endless members 112 are trained. The side frame members 180 and 182 also journal tail shaft 198 about which the tail ends of the endless member 112 are trained, as indicated in FIGS. 1 and 3.

Intermediate the head and tail shafts 192 and 198, intermediate shafts 200, 202, 204 are journalled in spaced apart relation. The shafts 200, 202 and 204 are respectively equipped with the respective pulleys 206, 208 and 210 across which the upper and lower runs of one of the endless members 112 are trained, while the shafts 200, 202, 204 are also equipped with respective pulleys 212, 214, 216, across which the upper and lower runs of the other endless member 112 are trained, as diagrammatically illustrated in FIGS. 1 and 3.

The respective pulleys 194, 206, 208, 210, 196, 212, 214, 216 are suitably proportioned in view of the endless member actuation functions they are to perform, and may be adjustably anchored in position on the respective shafts 192, 200, 202, 204, as by employing suitable hubs 220 on either side of same fixed in operating position by employing a suitable set screw 222 or the like. While the endless members 112 could be trained over similar pulley arrangements of a tail pulley type at the shaft 198, in the illustrated embodiment the bands 112 may be respectively trained directly over and in frictional engagement with the shaft 198.

The conveyor frame 110 and its shaft 192 has prop member 122 articulated to same, the latter comprising a pair of arms 230 and 232 journalled on the shaft 192 at either end of same. Arms 230 and 232 have fixed to the same side of same cross plate 134, as by employing suitable screws 236. Plate 234 serves the dual function of fixing the arms 230 and 232 together for defining prop member 122, and also serving as a ramp or discharge plate whereby the objects that have been labeled and discharged from the roller way 140 are directed downwardly of the discharge end 116 of conveyor frame 110 and over the upper end edge 160 of the machine hopper floor plate 47.

Figure 5:
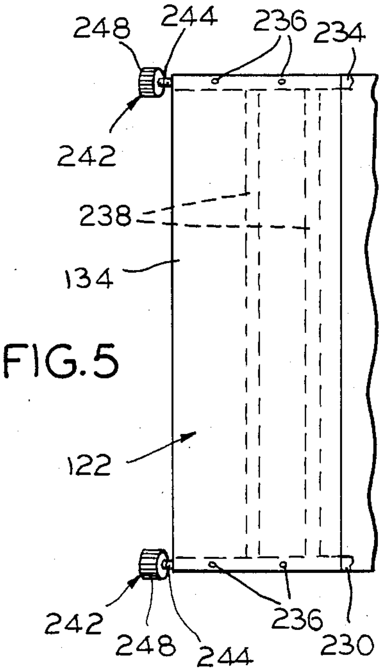
FIG. 5 is a fragmental plan view of the attachment propping leg structure, taken substantially along line 5—5 of FIG. 1.

As indicated in FIG. 5, arms 230 and 232 are also joined together by suitable tie bars 238. Further, the arms 230 and 232 are identically notched as at 240 to receive the upper edge 160 of the floor plate 47. The arms 230 and 232 are each equipped with a clamping member 242 comprising a threaded stud or shank 244 that is suitably threadedly mounted in a lug 246 that is integral with respect to the respective arms 230 and 232, which threaded shanks 244 respectively have keyed to same the respective knurlled operating handles 248. Thus, when the attachment 100 has been applied to the machine 30 with the prop member 122 articulated relative to the conveyor frame 110 as indicated in FIG. 1 and the upper edging 160 of the hopper floor plate 47 seated in the respective notches 240, clamp members 242 may be turned to seat their threaded shanks 244 against the underside 105 of the upper portion 104 of hopper floor plate 47 to fix the attachment 100 in its operating position in the simple triangular mounting connection arrangement that is indicated in FIG. 1.

The conveyor frame 110 adjacent either end of same also has mounted between the respective frame members 180 and 182 tie rods 260 and 262. Tie rod 260 has rockably mounted on same spaced arms or links 264 and 266, while the tie rod 262 rockably mounts similar arms or links 268 and 270 (see FIGS. 1 and 5). In the showing of FIG. 1, links 266 and 270 are fragmentally illustrated to exose the top portions of identical links 264 and 268 in front of same (see FIG. 4).

Figure 4:
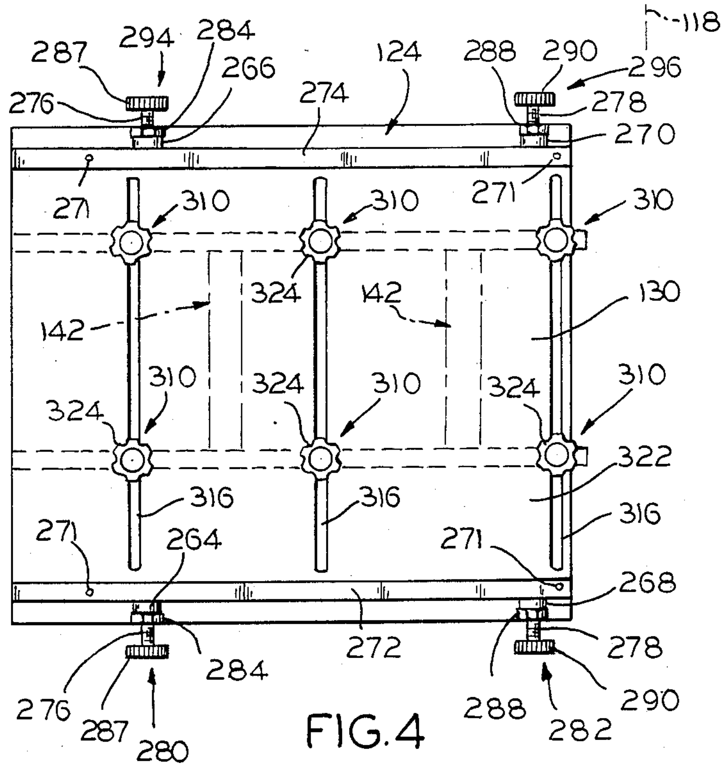
FIG. 4 is a top plan view of the panel structure components of the attachment, as viewed along line 4—4 of FIG. 1.

As indicated in FIGS. 2 and 4, plate 130 has suitably fixed to same in spaced apart relation, as by employing suitable screws 271 or the like, parallel side members 272 and 274. Member 272 threadedly receives the threaded shanks 276 and 278 of the respective clamp devices 280 and 282. The device 280 comprises suitable hex nut 284 that is threadedly mounted on the shank 278 for clamping engagement against arm or link 264, with the shank 276 extending through the elongate adjustment aperture 286 (see FIG. 1) that is formed in the link 264 and being operated by knurlled handle 287. Similarly, the device 282 includes the hex nut 288 that is threadedly mounted on the shank 278 of the device 282, which also includes knurlled operating handle 290, the shank 278 extending through elongate adjustment aperture 292 formed in the link 268.

Similarly, the panel structure side member 274 has cooperable therewith adjustment devices 294 and 296, respectively, that are identical to devices 280 and 282, respectively, as indicated by corresponding reference numerals, of which the shanks 276 and 278 thereof are applied in the elongate adjustment slots 298 and 300 (see FIG. 1) of the respective arms or links 266 and 270 for clamping of the arms or links 266 and 270 against the side member 274, using the respective nuts 284 and 288 (of devices 294 and 296).

It will be observed that the arms or links 264 and 266, and 268 and 270 connect together the panel structure 124 and the conveyor frame 110 in a parallel linkage connection arrangement, with the connection of the links 264, 266, 268, and 270 being adjustable at the respective slots 286, 298, 292, and 300, for manual adjustment and setting of the roller surface 134 at parallelism with the conveyor runs 126, as will be suitable for roll up through the roller way 140 of the objects 142 being labeled, such as the tubes 143. The specific setting of these parts will depend upon the external diameter of the objects 142 being labeled.

The side member 136 of the panel structure 124 is slidably mounted on the panel structure, by way of the threaded adjustment devices 310 (see FIGS. 2 and 4), each of which comprises in the form illustrated a stepped diameter shank 312 having its depending portion 314 shiftably mounted in the respective slottings 316 formed in the panel structure 124 (through plate 130 and foam panel 132) and threadedly mounted in the side member 136. Shank 312 includes upper portion 320 that clamps against the top surfacing 322 of the backing sheet 130, with knurlled handle 324 being provided for ease of manipulating the devices 310.

Similarly, the side member 138 is similarly equipped with the adjustment devices 310 that are indicated by corresponding reference numerals in FIGS. 3 and 4 whereby their shanks 312 are similarly threadedly connected to the side member 138 for affixing same in the desired position of adjustment by clamping the upper portion 320 of the shank 312 against the top surfacing 322 of sheet 130. Thus, by loosening the adjustment devices 310 of the side members 136 and 138, the devices 310 may be moved longitudinally of the respective slottings 316 to position the side members 136 and 138 as indicated by the length of the object to be labeled, after which the devices 310 may be set in operating position to fix the side members 136 and 138 to define the sides of the roller way 140.

Panel 132 is suitably affixed to the underside or surfacing 323 of sheet 130, as by employing a suitable adhesive.

The drive means 144 for motivating the endless bands 112 comprises a suitable drive chain 320 trained over sprocket 322 keyed to shaft 120 of support roller 32, and sprocket 324 keyed to head pulley shaft 192. The drive means 144 is preferably enclosed by a suitable housing 326 that is suitably anchored to the conveyor frame 110 in any convenient manner, as by employing attachment screws 328 to secure same to the ends of mounting plate 330 that in turn is received on the ends of shafts 120 and 192 (see FIG. 3). Optionally, motor 331 energized and controlled for driving purposes in any suitable manner is suitably mounted in housing 326 and drives sprocket 333 meshed with drive chain 320 to provide extra speed and torque as needed.

The swing arm 152 is disposed to one side of the labeling station A, and thus is at one end of the biasing roller 150 that may have a length approaching that of the rollers 32 and 33 (as indicated in outline in FIG. 3). Swing arm 152 at its axis 154 is fixed to a suitable stub shaft 340 suitably journalled in pedestal structure 342 that is mounted in any suitable manner on the machine table T. Biasing or pressure roller 150 in practice may comprise a tube 344 suitably journalled on swing arm 152 for rotation about axis 346 as it rides on the objects being labeled, or on roller 33. Pressure roller 150 biases the object 142 to be labeled against support rollers 32 and 33; this may be by way of gravity acting on roller 150 alone, or supplemented by spring action, as illustrated by torsion spring 156.

In operation, as disclosed in said patent, the separator roller 50, the feed rollers 36 and 37, the guide roller 62, the glue coating roller 60, and the support rollers 32 and 33 are all driven at the same surface speed by the means disclosed in said patent. When the machine 30 is operating, the shaft 120 is constantly driven, whereby head pulley shaft 192 and the endless conveyors 113 are also constantly operating, and in the direction indicated by the arrows of FIG. 1.

As part of the set up of the machine 30 as equipped with the attachment 100, the panel structure 124 may be adjusted toward and away from the labeling station A, by appropriate manual operation of the clamp devices 280, 282, 294 and 296 and the swinging of the support or mounting arms 264, 268, 266 and 270, as needed, to insure that the downwardly projecting end of the panel structure is positioned to accept the individual objects 142 after they have been labeled and displaced by the subsequent or consecutive object 142 to be labeled, which as indicated, is manually pressed into labeling position in the labeling station A by being inserted between the pressure roller 150 and the support roller 33, thence against the freshly labeled object 142 to snap the latter into the entrance of the roller way 140 where the rolling action provided by the conveyors 113 is induced on the individual objects 142 to roll them up the roller way for gravity discharge over the upper end of the hopper floor plate 47.

The speed at which the individual objects 142 can be placed in labeling position and then labeled, followed by manual replacement to snap the freshly labeled object 142 into the roller way 140 effects a disposing of the individual objects 142 in closely spaced relation within the roller way 140 whereby they are in substantial stacked relation as they are moved away from the labeling station A. As indicated, this removal of the objects 142 and stacking of same during the course of the removal, from the labeling station A, is effected mechanically after the freshly labeled objects have been one by one replaced by a fresh object 142 to be labeled.

The drive arrangement for the conveyors 113 being effected through the head pulley shaft 192, the drive on the bands 112 is by way of the exercise of a desired leverage on such bands for effecting improved positive rolling of the objects 142 through the roller way 140.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a semi-automatic labeling machine for consecutively applying discrete labels of the same predetermined size to each container of a run of round containers each of which is of the same predetermined size including external diameter, with the labeling machine including a label supply station hopper having a downwardly sloping floor plate, a glue applying station, a labeling station including a pair of rotatable support rollers each having its longitudinal axis disposed normally of the path of movement of the individual labels from the supply hopper therefor through the stations, upon which machine support rollers round containers of a container run to be consecutively labeled may be manually consecutively applied on the side thereof to be supported and rotated about the longitudinal axis thereof by the machine support rollers when the latter are rotating, with the glue applying station including means for applying glue to the underside of the respective labels when received from the label supply station, and means for consecutively feeding the discrete labels longitudinally thereof along a feed path including one of said support rollers being in overlying relation to said feed path and a label feed guide mounted below the one support roller and including guide surfacing concentric with the periphery of the one support roller and disposed to direct the leading end of a label to be applied to the run container external side wall surfacing at a predetermined outfeed angle, with the one support roller being rotatable about a stationary axis and the other support roller being mounted for adjustment toward and away from the one support roller, to support and rotate containers for runs of such containers of variant diameters for label application run purposes and accommodate labeling containers of container runs made up of containers of all the same but variant container run sizes, and with the means for feeding the discrete labels for a run of such containers including means for individually feeding the labels from the hopper through the glue applying station along the path of movement for application of glue thereto and then to label applying relation at the labeling station, and after one of the labels has been applied to consecutive of the run containers, the labeled container is manually removed from the support rollers to be manually replaced by the next run container to be labeled, the improvement for adapting the labeling machine to consecutively supply discrete labels from the supply hopper through the stations and consecutively apply such labels to cylindric objects of a run of such cylindric objects each of which is of the same predetermined size including diameter, and each of which is consecutively manually applied to the support rollers to dispose same in labeling position, and to effect automatic removal of the consecutively labelled cylindric objects from their labeling position on the support rollers by the manually placing of the next cylindric object to be labelled on the support rollers in the labeling position thereof, with the labels to be so applied to the cylindric objects of such run being each of the same predetermined size, said improvement comprising:

an attachment for the labeling machine comprising:

a conveyor frame having intake and discharge ends, with the intake end of same being articulated to the machine in alignment with the axis of the machine one support roller, and with the discharge end of same having a prop frame articulated to same, means for securing said prop frame to the machine floor plate for disposing said conveyor frame in overlying relation to the machine floor plate, said conveyor frame including endless conveyor means extending between and defining on the operation thereof said intake and discharge ends of same, said conveyor means comprising an upper conveying run and a lower return run, said attachment further comprising a panel structure mounted on said conveyor frame in overlying relation to said upper conveying run, said panel structure including a planar frictional resistant rolling surface opposing and spaced from said upper conveying run, means for adjustably setting said panel structure with respect to said conveyor frame to space said panel structure roller surface from said conveyor means upper conveying run along the length of the latter for defining a roller way of uniform depth there along for rollably and consecutively receiving the cylindric objects in rolling friction engagement relation of the objects with both said upper conveying run and said rolling surface from the roller way intake end adjacent the machine support rollers through the roller way and its discharge end adjacent the conveyor frame discharge end, and means for driving said conveyor means to move said upper conveying run away from the axis of the one machine support roller and said return run toward the axis of the one machine support roller for rolling the consecutive objects through the roller way and its said discharge end, said improvement further including:

a pressure roller disposed above the pair of machine support rollers and in vertical alignment with the said other support roller of the machine support rollers, said pressure roller being journalled on a swing arm mounted for swinging movement toward and away from the machine other support roller in an arc about an axis paralleling the machine support roller axes, means for biasing said pressure roller toward the machine other support roller, said swing arm being proportioned for locating said arc to pass through said labeling position that the individual labeling run objects are to have when individually supported for labeling on the machine support rollers.

said setting means includes means for adjusting said panel structure toward and away from the machine labeling station for positioning said roller way intake end to rollably and consecutively receive from the labeling station the respective cylindric objects of such run disposed at said position for labeling when the respective objects are displaced from such position toward said roller way intake end, whereby, for a particular run of the cylindric objects of all the same size including diameter, when the machine is operated to rotate the machine support rollers and label the run objects one by one with consecutive labels of the same predetermined size, and said pressure roller rides on the machine other support roller, and when an object of the run to be labelled is manually inserted in said labeling position by manually pressing same against said pressure roller and the machine other support roller and into the labeling station for labelling at said labelling position, and such labelling of same is effected, and consecutively thereafter the following objects of the run to be labelled are similarly manually inserted into the labelling station at said position to consecutively displace the immediately proceeding object of the run into said roller way intake end, as the cylindric objects of the labelling run are consecutively labeled by the labelling machine, such objects are consecutively entered into said roller way for automatically exiting same from the labeling station lengthwise of said roller way and to and through the roller way discharge end for discharge over said prop frame, and the pressure roller when resting on one of the objects to be labeled at the labeling station biases same against the machine support rollers for maintaining same at the labeling station for labeling purposes.

2. The improvement set forth in claim 1 wherein:

said roller way is proportioned lengthwise thereof for disposing said discharge end of said conveyor means to discharge the consecutively labeled objects from above the level of floor plate upper end.

3. The improvement set forth in claim 2 wherein:

said prop frame is secured to the upper end of said floor plate and includes means for ramping the consecutively labeled objects discharged from said discharge end of said conveying means for gravity discharge of same over the floor plate upper end.

4. The improvement set forth in claim 1 wherein said panel structure includes:

a pair of elongate rectilinear guide members disposed one on either side of said roller way and extending longitudinally thereof, and means for adjusting said members toward and away from each other to confine the width of said roller way to the length of the series of objects being labeled in the labeling run.

5. The improvement set forth in claim 1 wherein:

said setting means comprises:

a first pair of links connected between said conveyor frame and said panel structure adjacent the intake end of said conveyor frame, and a second pair of links connected between said conveyor frame and said panel structure adjacent the discharge end of said conveyor frame, said links being pivoted to said conveyor frame parallel linkage fashion, and said links being adjustably fixedly connected to said panel structure for effecting said setting of said panel structure with respect to said conveyor frame, and for adjusting said panel structure to position said roller way intake end to rollably and consecutively receive the consecutively labeled objects when displaced from said labeling position by the next such object to be labeled.

6. The improvement set forth in claim 1 wherein:

said rolling surface of said panel structure is formed by a foam material.

* * * * *